Figure 1:
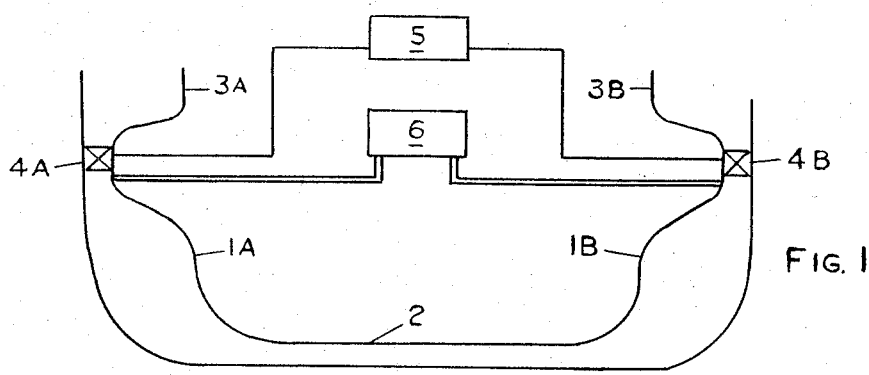

Feb. 28, 1967  H. D. FANSHAWE  3,306,247
STABILIZING APPARATUS FOR SHIPS
Filed Dec. 31, 1964  2 Sheets-Sheet 1

INVENTOR
HEW DALRYMPLE FANSHAWE

*Larson and Taylor*
ATTORNEYS

INVENTOR
HEW DALRYMPLE FANSHAWE
*Larson and Taylor*
ATTORNEYS

United States Patent Office 3,306,247
Patented Feb. 28, 1967

3,306,247
STABILIZING APPARATUS FOR SHIPS
Hew Dalrymple Fanshawe, North Berwick, Scotland, assignor to Brown Brothers & Co. Limited, Edinburgh, Scotland, a company of Great Britain
Filed Dec. 31, 1964, Ser. No. 422,716
Claims priority, application Great Britain, Dec. 31, 1963, 51,268/63
6 Claims. (Cl. 114—125)

This invention relates to stabilizing apparatus for ships and particularly to stabilizing apparatus of the type in which interconnected tanks contain liquid which is transferred between the tanks to provide a stabilizing bias.

The natural rolling period of a ship is not greatly affected by the action of wind and sea, and where an installation is required for roll damping only, i.e., passive stabilization, the tanks on opposite sides of the ship may be connected by an open flume or closed conduit of such dimensions that the period of oscillation of the system matches the roll period of the ship, the residual roll then causing transfer of the quantity of stabilizing liquid necessary for the damping of synchronous rolling without requiring the use of motive power.

If more than passive roll damping is needed, i.e., active stabilization in which action is taken to counteract a roll before it develops, a stabilizing apparatus is called for which can apply power to the transference of liquid in the absence of residual rolling, and which can respond quickly to incipient rolls which, in a confused sea, may come in slow or quick succession. For this latter purpose the mass-flow rate of transfer of stabilizing liquid needs to be much higher than in a passive system. As an example, in a large ship, the mass-flow rate of transfer of stabilizing liquid may be as high as thirty tons per second. It will be appreciated that applying power at such high flow-rates can require large and expensive pumping capacity with the additional difficulty of flow reversals every few seconds.

Further, the cross-sectional area of a conduit or flume dimensioned to provide a natural period of oscillation close to the natural period of the vessel will be relatively large. Any further reduction of the time of transfer of the liquid calls for a conduit of still larger section or some alternative means of reducing the period of the system.

One such means is to use a pump to accelerate the liquid, but should more kinetic energy be imparted to the liquid than is lost in kinetic and frictional losses of transfer over any complete cycle of operation, the pump must act regeneratively to absorb the excess energy during part of the cycle, or the excess energy will be wasted.

It is an object of the present invention to provide a stabilizing apparatus which does not suffer from the disadvantages referred to.

Stabilizing apparatus for a ship according to the invention incorporates two units disposed in side by side relationship, each unit consisting of two spaced main tanks contrived to contain stabilizing liquid and interconnected to one another by a conduit located to be submerged when the unit contains the requisite quantity of the stabilizing liquid, each main tank being connected at the top to a subsidiary tank by way of a valve, means for changing the level of the stabilizing liquid in one main tank of each unit with respect to the level of the liquid in the other main tank of the same unit, and means for operating the valves of both units in a determined phase relationship, corresponding tanks of the two units having capacities and space relationships such that the two units are capable of providing substantially similar stabilizing effects.

The subsidiary tanks may be open to the atmosphere in installations in which high rates of transfer of stabilizing liquid are not required. Means may be provided for drawing stabilizing liquid from the main tanks and introducing it to a selected subsidiary tank. Alternatively the subsidiary tanks may be closed tanks and may contain quantities of gas, means being provided for creating and controlling a gas pressure difference between the subsidiary tanks of each unit. The gas pressure may be sub-atmospheric.

The two spaced tanks of each of the two units may be located at opposite sides of the ship for roll stabilization or may be spaced in a fore and aft direction for pitch stabilization.

The valve providing a connection between each main tank and its associated subsidiary tank may be arranged to open automatically when the pressure in the main tank exceeds the pressure in the subsidiary tank and to close again immediately the flow associated with the pressure difference ceases, the valve being operable by the control means when other conditions prevail.

The means for creating and controlling the gas pressure difference between the spaced tanks of each unit may consist of means for heating the gas contained in a selected tank, or means for transferring operating liquid from the main tanks of the unit to a selected subsidiary tank, or means for adding gas to one tank and withdrawing gas from the other tank, or means to move a piston or movable bulkhead set in the wall of each subsidiary tank so that its effective volume is changed. The piston or the bulkhead may be common to the two subsidiary compartments of a unit. For example, a common piston may be movable in a cylinder or a conduit between the subsidiary compartments which thus remain separately gas-tight. It will be appreciated that each of these pressure-varying means is a means whereby power is applied or energy supplied.

The means for creating the gas pressure difference or the means for drawing stabilizing liquid from the main tanks and introducing it to a selected subsidiary tank may be controlled by means capable of sensing the maximum level reached by the liquid in the subsidiary tanks during each cycle and setting in operation the means for drawing stabilizing liquid from the main tanks and introducing it to a selected subsidiary tank or the means for creating and controlling the gas pressure difference when the maximum liquid level in the subsidiary tanks reaches only a predetermined low maximum level so that liquid is added or energy is added to the liquid to raise the maximum level it reaches in the subsidiary tanks during each cycle. Where the subsidiary tanks are closed tanks the maximum gas pressure attained in the subsidiary tanks may be the control parameter instead of the liquid level.

Means may be provided for exhausting the space above the liquid in one main tank to cause the liquid level in that tank to rise.

The valves may be connected to roll-sensing means operable at the start of a roll to operate the valves of the two units in a phase relationship determined by the roll-sensing means.

Each unit may take the general form of a U-tube with a bulkhead separating the upper end of each limb into a main tank and a subsidiary tank, the two tanks being connected by way of the valve means.

The liquid may be water and the gas may be air or water vapour and steam or a mixture thereof.

Figure 2:
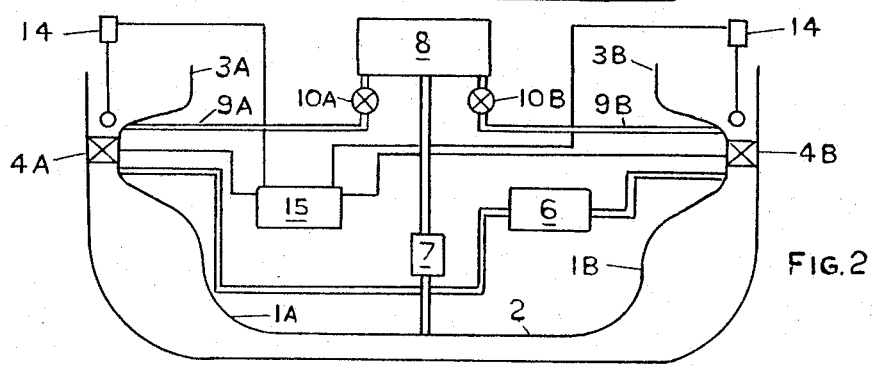
Figure 3:
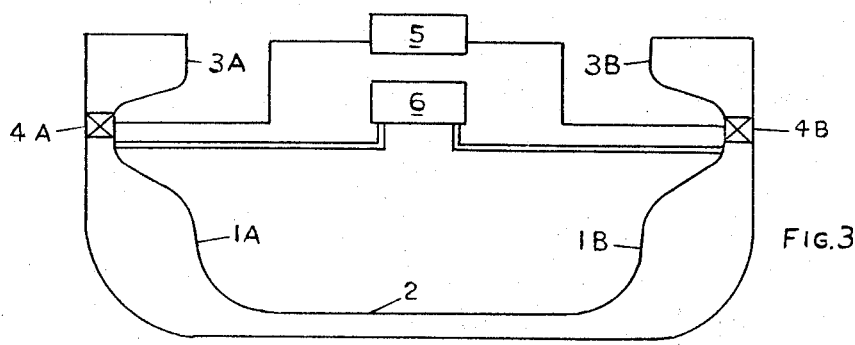
Figure 4:
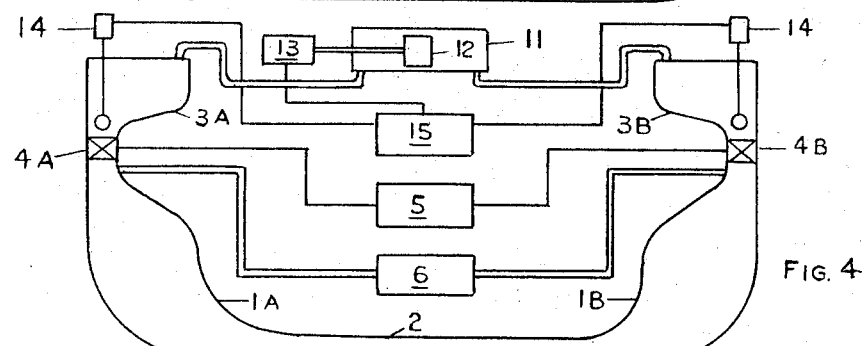
Figure 5:
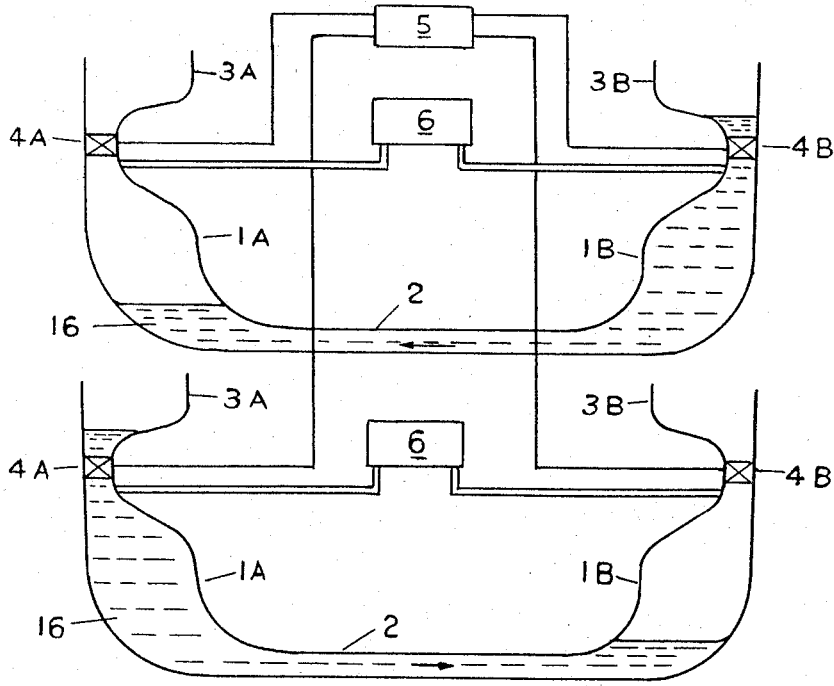
Figure 6:
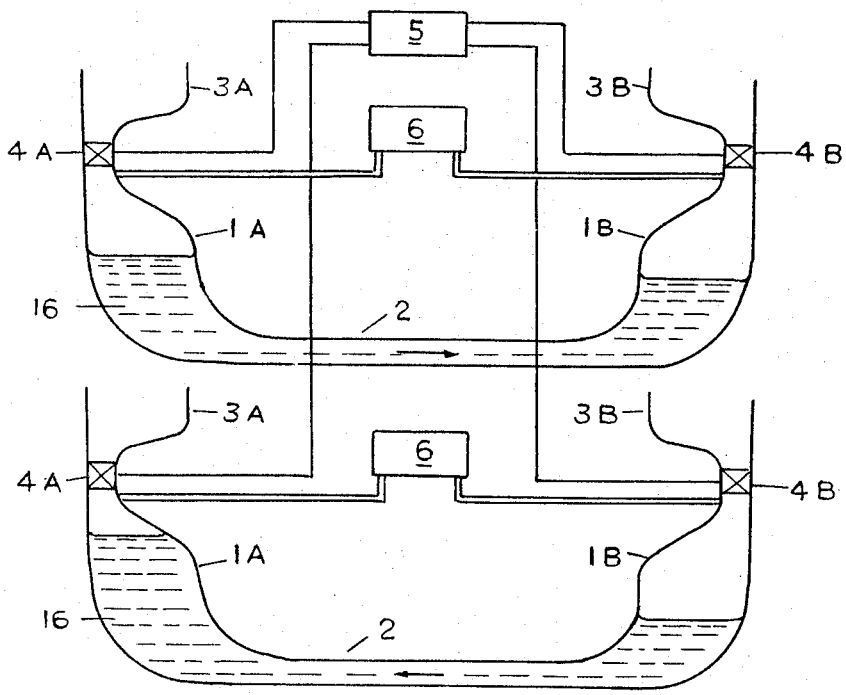

Practical embodiments of the invention are illustrated diagrammatically in the accompanying drawings in which FIGS. 1 and 2 illustrate different forms of individual units providing respectively passive and active stabilization in which the subsidiary tanks are open to the atmosphere and FIGS. 3 and 4 illustrate different forms of individual units providing respectively passive and active stabilization in which the subsidiary tanks are closed tanks; FIG. 5 illustrates a complete stabilizing apparatus of two units which are shown in the stabilized state, i.e., providing no stabilizing bias, and FIG. 6 illustrates the stabilizing apparatus of FIG. 5 shown in the state in which a stabilizing bias less than the maximum possible with the illustrated apparatus is being provided.

In the drawings, 1A and 1B denote main tanks connected to one another by a conduit 2 located to be submerged when the requisite quantity of stabilizing liquid is in the tanks. 3A denotes a subsidiary tank connected to the main tank 1A by a valve 4A and 3B denotes a subsidiary tank connected to the main tank 1B by a valve 4B. 5 denotes roll-sensing apparatus for operating the valves 4A and 4B in a phase relationship determined by the degree of stabilizing action called for by the roll-sensing apparatus and 6 denotes a vacuum pump for exhausting the space above the liquid surface in either the main tank 1A or the main tank 1B. Referring particularly to FIG. 2, 7 denotes a pump connected to the conduit 2 and to a reservoir 8 to draw liquid from the main tanks 1A and 1B and pump it into the reservoir 8, and 9A and 9B are pipes connected to the reservoir 8 by way of valves 10A and 10B to the subsidiary tanks 3A and 3B respectively. In FIGS. 3 and 4 the subsidiary tanks 3A and 3B are closed and contain a quantity of gas. Referring particularly to FIG. 4, 11 denotes a cylinder opposite ends of which are connected respectively to the subsidiary tanks 3A and 3B, and 12 denotes a common piston slidable in the cylinder 11. The piston 12 is coupled to power means 13 provided to move the piston 12 in one direction or the other and thus increase the pressure in the one subsidiary tank and reduce the pressure in the other subsidiary tank. 14 (FIGS. 2 and 4) denotes liquid level sensing means in the subsidiary tanks 3A and 3B controlling the operation of a servo-device 15 operable to manipulate the valves 10A and 10B (FIG. 2) or control the power means 13 (FIG. 4). 16 (FIGS. 5 and 6) denotes stabilizing liquid contained in each unit. The valves 4A and 4B as well as being controlled by the roll-sensing means 5 are contrived to operate independently and automatically as non-return valves, to open when the pressure in the associated main tanks 1A and 1B respectively exceeds the pressure in the associated subsidiary tanks 3A and 3B respectively and to close when the pressure in the associated subsidiary tanks 3A and 3B respectively exceeds the pressure in the associated main tanks 1A and 1B respectively.

In practice, each apparatus is prepared for use by setting the conditions illustrated in FIG. 5. This is done by operating the means 6 for raising the level of the operating liquid in one main tank 1A or 1B above the level of the liquid in the other main tank 1B or 1A of each unit until the liquid completely fills opposite main tanks of the two units up to the associated valve means 4A or 4B at its highest point, some of the liquid passing through the valve means into the associated subsidiary tank 3A or 3B, the opposite filled tanks in the two units being on opposite sides of the ship where the apparatus is for roll stabilization, or one fore and one aft where the apparatus is for pitch stabilization. The apparatus is then in equilibrium.

The apparatus according to the invention is readily distinguishable from apparatus previously made or proposed in that a single unit when prepared to operate is in one of two conditions either applying full bias to port or to starboard, or to the fore part of the ship or to the after part, and never remains in the neutral bias position even when the ship is sailing on an even keel; thus at least one pair of such units is essential to the working of an installation according to the invention.

Operation of the apparatus is controlled by the roll-sensing means 5 which controls operation of the valves 4A and 4B. To set the apparatus in operation the valve 4A or 4B in one main tank 1A or 1B where the liquid level is higher is opened and the weight of liquid in the tank alone in the embodiments illustrated in FIGS. 1 and 2 or the weight of liquid in the tank together with the gas pressure difference between the tanks in the embodiments illustrated in FIGS. 3 and 4 initiates a flow of liquid from the tank 1A or 1B in which the level was previously higher into the other tank 1B or 1A. In the embodiments illustrated in FIGS. 3 and 4 the gas in said other tank 1B or 1A is then compressed. The increase in pressure in said other tank 1B or 1A causes the valve 4B or 4A to open automatically and some liquid flows into the subsidiary tank 3B or 3A. In the embodiments illustrated in FIGS. 3 and 4 the gas pressure in the subsidiary tank 3B or 3A is increased.

If there were no frictional or other losses, and the ship were unaffected by an incipient or residual roll, the liquid would just cease moving as the new liquid level in the tank which had previously been lower reached the same relative height as in the first tank before its valve was opened. At this moment the relative liquid levels in the tanks would be precisely reversed and opposite to the state illustrated in FIG. 5 and the automatic closure of the respective valves 4A and 4B would prevent the return oscillations towards the first tank.

In practice, however, energy is lost by friction and other means and is also lost or, more frequently, gained due to any slight roll effective during transfer.

If, in the active stabilization units illustrated in FIGS. 2 and 4, the average loss of energy is greater than the gain of energy the average net loss is made up each transfer or each alternate transfer. In the embodiment illustrated in FIG. 2 the net loss is made up by adding liquid to the subsidiary tanks 3A and 3B from the reservoir 8, the flow of liquid to the respective tanks being controlled by the valves 10A and 10B which are operated by the servo-device 15 which is under the control of the liquid-level sensing means 14. The reservoir 8 is replenished by the pump 7. In the embodiment illustrated in FIG. 4 the net loss is made up by increasing the pressure difference between the subsidiary tanks 3A and 3B by movement of the piston 12 by the power means 13 which is controlled by the liquid-level sensing means 14, otherwise the angle of residual roll will increase until equilibrium conditions are re-established. The small difference between average losses and actual losses may appear after each transfer as a difference in the quantity of liquid entering the appropriate subsidiary tank, while differences in the average loss resulting from sea conditions may be compensated by adjusting the supply of energy to the liquid.

If the liquid in both units moves simultaneously and in opposite phase the equilibrium condition is maintained because equal quantities of liquid are transferred simultaneously across or longitudinally of the ship in opposite directions. The apparatus provides a stabilizing effect varying from zero to a maximum by altering the phase relationship in which the valve 4A or 4B in the main tank 1A or 1B containing liquid at the higher level in one unit is opened with respect to the valve 4A or 4B in the main tank 1A or 1B containing the liquid at the higher level in the other unit. FIG. 5 illustrates apparatus providing a stabilizing effect between zero and the maximum effect of which the apparatus is capable. The valve 4A of the unit shown on top is opened a small interval of time before the valve 4B of the unit shown below. A small stabilizing effect only is thus provided since as can be seen in the illustration there is then only a small difference between the amounts of liquid on opposite sides or opposite ends of the ship at any instant while the transfer of liquid from one tank to the other in each unit is taking place. In the extreme condition when the maxium stabilizing effect is required the valve 4A or 4B in the main tank 1A or 1B containing liquid at the higher level in one unit only is opened. The liquid in that unit then flows across to the other side or the other end as previously described and the liquid in both tanks 1A or 1B on the same side or at the same end of the ship reaches the higher level thus providing the maximum bias on that side or end of the ship and the maximum stabilizing effect. The liquid is retained in that position in both units as long as it is necessary to counteract a roll. If a large sea should then develop a heavy roll bias in the opposite direction both valves 4A or 4B in the full tanks 1A or 1B open simultaneously so that all the liquid is transferred to the tanks 1B or 1A on the opposite side or end of the ship to be retained there as long as it is necessary. If the succeeding seas are of less intensity the roll-sensing means 5 alters the phase relationship of the valves 4A and 4B so that some differential effect is again produced as is shown in FIG. 5 to match the stabilizing effect to the sea conditions as can be done while always maintaining a transfer of the full quantity of liquid from one main tank 1A or 1B to the other main tank 1B or 1A in each unit. This transfer of the full quantity of liquid is essential to carry out the objects of the invention, in particular to allow the application of power at a higher rate, to limit the use of power to overcoming losses in liquid transfer, and to provide quick response.

In the system according to the invention the means 6 for raising the level of the liquid in one tank 1A or 1B at the expense of the other tank 1B or 1A may be of comparatively small power output since the act of initially setting each unit, i.e., raising the liquid level in one tank and reducing it in the other, does not require to be performed in any minimum period of time.

In many cases it will be found advantageous to equip a ship with two or more separate installations as described, the installations not necessarily being of the same size, or necessarily operating at the same pressure head where the subsidiary tanks are closed tanks. In conditions where a small degree of stabilization is necessary one installation only will be brought into use and for the most severe conditions all of the installations will be brought into use.

In the operation of the system incorporating closed subsidiary tanks as illustrated in FIGS. 3 and 4 the pressure difference between the tanks may conveniently be altered during the time available between liquid transfers. Where the energy to be applied is in a form for which the time of application is not important, as may be the case where steam provides the pressure, the energy may be applied during the early part of the liquid transfer thereby tending to maintain the pressure difference between the tanks.

In the embodiments of FIGS. 1 and 3 which provide passive stabilization, i.e., roll damping without the application of power, the roll-sensing means 5 may be so arranged that the valves 4A and 4B open only when the heel of the ship is such that the potential energy available as a result of the difference in level between the tanks of each unit is sufficient to make up the energy lost in transfer and accordingly a full transfer can be assured.

What is claimed is:

1. Stabilizing apparatus for a ship, comprising two units disposed in side by side relationship; each unit consisting of two spaced main tanks contrived to contain stabilizing liquid, a conduit interconnecting the tanks, said conduit being located to be submerged when the unit contains the requite quantity of the stabilizing liquid, subsidiary tank connected to the top of each main tank a valve intercalated between each main tank and the associated subsidiary tank, and means for changing the level of stabilizing liquid in one main tank with respect to the level of the liquid in the other main tank; and means for operating the valves of both units in a determined phase relationship, corresponding tanks of the two units having capacities and space relationships such that the two units are capable of providing substantially similar stabilizing effects.

2. Apparatus as claimed in claim 1 in which means provided for drawing stabilizing liquid from the main tanks of each unit and introducing it to a selected subsidiary tank of the same unit.

3. Apparatus as claimed in claim 2 in which the means for drawing stabilizing liquid from the main tanks each unit and introducing it to a selected subsidiary tank of the same unit is controlled by means capable of sensing the maximum level reached by the liquid in the subsidiary tanks during each cycle and setting in operation the means for drawing stabilizing liquid from the main tanks and introducing it to a selected subsidiary tank when the maximum liquid level in the subsidiary tank reaches only a predetermined low maximum level.

4. Apparatus as claimed in claim 1 incorporating means for exhausting the space above the liquid in one main tank of each unit to cause the liquid level in that tank to rise and the liquid level in the other main tank of the same unit to drop.

5. Apparatus as claimed in claim 1 incorporating roll sensing means operable at the start of a roll to operate the valves of the two units in a phase relationship determined by the rolling-sensing means.

6. Apparatus as claimed in claim 1 in which each unit has the general form of a U-tube with a bulkhead separating the upper end of each limb into a main tank and a subsidiary tank, the two tanks being connected by way of the valve means.

References Cited by the Examiner

UNITED STATES PATENTS

| 2,024,822 | 12/1935 | Hort | 114—12 |
| 2,963,245 | 12/1960 | Bolton | 114—125 |
| 3,083,673 | 4/1963 | Ripley | 114—12 |
| 3,195,497 | 7/1965 | Field | 114—12 |

FOREIGN PATENTS 321,470  10/1934  Italy.

MILTON BUCHLER, *Primary Examiner.*

FERGUS S. MIDDLETON, *Examiner.*

T. M. BLIX, *Assistant Examiner.*